US007636516B2

(12) United States Patent
Frauhammer et al.

(10) Patent No.: US 7,636,516 B2
(45) Date of Patent: Dec. 22, 2009

(54) MACHINE TOOL AND METHOD FOR OPERATING A MACHINE TOOL

(75) Inventors: Karl Frauhammer, Leinfelden-Echterdingen (DE); Gerhard Meixner, Filderstadt (DE); Martin Rittner, Stuttgart (DE); Heinz Schnerring, Dettenhausen (DE); Andreas Strasser, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/814,394

(22) PCT Filed: Sep. 11, 2006

(86) PCT No.: PCT/EP2006/066206

§ 371 (c)(1), (2), (4) Date: Jul. 20, 2007

(87) PCT Pub. No.: WO2007/051667

PCT Pub. Date: May 10, 2007

(65) Prior Publication Data

US 2008/0211328 A1 Sep. 4, 2008

(30) Foreign Application Priority Data

Oct. 31, 2005 (DE) ...................... 10 2005 052 037

(51) Int. Cl.
*H02P 5/00* (2006.01)

(52) U.S. Cl. .......................... 388/800; 388/937; 310/50

(58) Field of Classification Search ................. 388/937, 388/800, 809; 310/239, 50
See application file for complete search history.

(56) References Cited

U.S. PATENT DOCUMENTS

| | | | | |
|---|---|---|---|---|
| 3,480,813 | A | 11/1969 | Sillano | |
| 3,914,673 | A | 10/1975 | Wallin | |
| 4,342,931 | A * | 8/1982 | Grossmann et al. | 310/50 |
| 4,595,851 | A * | 6/1986 | Houben et al. | 310/246 |
| 5,089,729 | A * | 2/1992 | Moores, Jr. | 310/50 |
| 5,138,243 | A | 8/1992 | Kress et al. | |
| 5,955,802 | A * | 9/1999 | Karasa et al. | 310/50 |
| 6,424,112 | B1 * | 7/2002 | Schauer | 318/599 |
| 2004/0084991 | A1 * | 5/2004 | Buck et al. | 310/239 |

FOREIGN PATENT DOCUMENTS

| | | |
|---|---|---|
| DE | 39 43 651 | 1/1993 |
| DE | 195 40 740 | 8/1996 |
| GB | 356 595 | 9/1931 |

* cited by examiner

*Primary Examiner*—Rina I Duda
(74) *Attorney, Agent, or Firm*—Michael J. Striker

(57) ABSTRACT

The invention relates to a machine tool comprising an electric motor (2) which serves to drive a tool and which has an adjustable, electric brush arrangement (3), and comprising a mode selector switch (6) having various switch positions. Provision is made for an adjusting device (8) to displace the brush arrangement (3) as a function of the switch position of the mode selector switch (6). Furthermore, the invention relates to a corresponding method.

8 Claims, 1 Drawing Sheet

MACHINE TOOL AND METHOD FOR OPERATING A MACHINE TOOL

Figure 1:
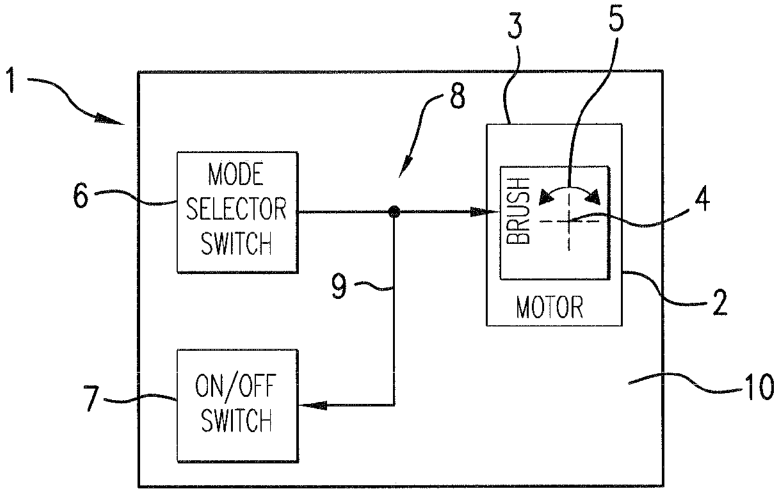

The present invention relates to a machine tool with an electric motor that serves to drive a tool and that includes an adjustable electric brush configuration, and with a mode selector switch with various switch positions.

RELATED ART

A machine tool of the type described above is known. A tool of the machine tool, driven by an electric motor, is switched to one or more types of motion depending on the tool function, in order to machine a work piece. It may be necessary to use a single type of motion or a combination of several types of motion to operate the tool in one operating mode. It is also possible for the machine tool to operate the tool in several operating modes in which the tool performs different tool functions. The operating mode of the machine tool is selected using a mode selector switch, with which the desired operating mode can be selected from an array of possible operating modes of the machine tool. When an adjustable electrical brush configuration is used, there is the added possibility of influencing the rotational motion of the electric motor and, therefore, the motion of the tool generated by the electric motor. For example, the electric motor can be operated with right or left rotation by selecting the related settings of the brush configuration of the electric motor. The rotational speed of the electric motor can also be selected higher or lower using related settings of the brush configuration. The various possible settings require more detailed knowledge of the operation of the machine tool.

ADVANTAGES OF THE INVENTION

The inventive machine tool has an adjusting device that displaces the brush configuration of the electric motor depending on the setting of the mode selector switch and offers the advantage that the operator only needs to select a desired setting using the mode selector switch without needing to know the associated settings of the brush configuration, since they are implemented automatically. The operator only needs to know which operating mode he wants to operate the tool in, and he can select this operating mode using the mode selector switch. The adjusting device automatically implements all settings of the drive depending on the setting of the mode selector switch; the settings result in the motions of the tool corresponding to the operating mode, and particularly the setting of the brush configuration. The settings of the brush configuration are therefore always matched up with the selected operating mode, so that the operator can always operate the machine tool correctly without having technical knowledge. The mode selector switch can be designed as a mechanical switch, e.g., as a rotary knob, which indicates the individual operating modes as switch settings. As an alternative, the mode selector switch can include one or more electrical switches, which can be used to select the desired operating mode from a menu, for example.

The adjusting device is preferably a mechanical adjusting device, an electrical adjusting device, or a combination of a mechanical and an electrical adjusting device. With a mechanical mode selector switch, the switching motion from one switch setting to another switch setting can be used to mechanically adjust the drive elements of the tool that determine the type of motion of the tool. When a brush configuration is included, it is automatically adjusted by the adjusting device when the mode selector switch is switched. With an adjusting device with mechanical and electrical components, an electric motor, e.g., that displaces the brush configuration using a transmission can be controlled electrically using at least one switch to select the operating mode.

It is also advantageous when there is an on/off switch for the electric motor, which is operatively connected with the adjusting device and, as a result, functions in the push-button mode or the click-stop switch mode, depending on the setting of the mode selector switch. The on/off switch can be designed, e.g., such that it reaches its "on" setting when pressed manually downward and returns to the "off" setting when released, in the push-button switch mode. In the click-stop switch mode, the on/off switch can be held in the pressed-down "on" setting using an arresting element, e.g., by a detent mechanism snapping in place in the switch, until the arresting element is released. With a switch of this type, the adjusting device can act on the arresting element, for example, and trigger the return to the "off" setting or hold it in the "on" setting when the on/off switch is released, depending on the setting of the mode selector switch.

The adjusting device can act on the on/off switch in various ways. As an alternative, a branch of the adjusting device acting between the mode selector switch and the brush configuration, or a separate part of the adjusting device that extends directly from the mode selector switch or the brush configuration can be operatively connected with the on/off switch and, e.g., act on its arresting element.

According to a refinement of the present invention, the machine tool is a hand-held power tool. The link—mentioned above—between the mode selector switch and the brush configuration of the electric motor, which serves to drive the tool, is particularly suited for a hand-held power tool such as a rotary hammer, since, e.g., a setting of the mode selector switch for chiseling operation displaces the brush configuration into a setting in which the electric motor operates faster than in the "normal" chiseling mode, thereby making it possible for a higher impact rate—or hammering output—to be attained without the use of additional electronics. A link between the mode selector switch with the on/off switch is also suited for a hand-held power tool such as a rotary hammer, since the rotary hammer is handled best with an on/off switch as a click-stop switch in the "hammer" operating mode (chiseling operation), and, in the "drilling" mode (drilling and impact drilling operation), the on/off switch can only be operated as a push-button switch (dead man's switch), due to safety regulations.

The present invention also relates to a method for operating a machine tool with an electric motor that serves to drive a tool and includes an adjustable electric brush configuration, and with a mode selector switch with various switch positions. It is provided that the brush configuration is automatically displaced depending on the operating mode selected on the mode selector switch. The operator is not required to adjust the brush configuration separately or to have knowledge about which setting to select for the brush configuration for which operating mode.

According to a refinement of the present invention, it is provided that, with an operating mode with a rotating tool, the on/off switch includes a push-button switch function, with which a dead man's switch of the machine tool is realized, for example.

In an operating mode with a striking tool, the on/off switch preferably includes a click-stop switch function, which is optimal for handling in this operating mode, e.g., with chiseling operation of hand-held power tools such as a rotary hammer.

It is provided, in particular, that at least one setting of the brush configuration that can be selected using the mode selector switch is a setting that increases the rotational speed of the electric motor. This makes it possible to attain increased tool output without additional electronics.

DRAWING

The present invention is explained below in greater detail in three exemplary embodiments, with reference to the attached drawing.

Figure 2:
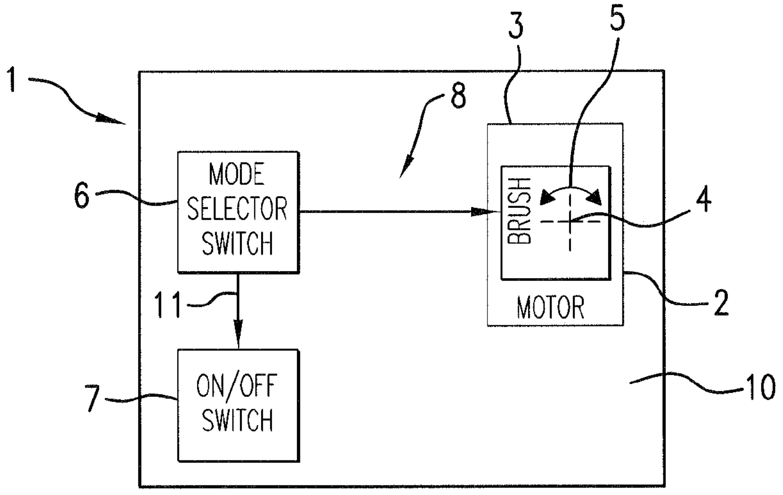
Figure 3:
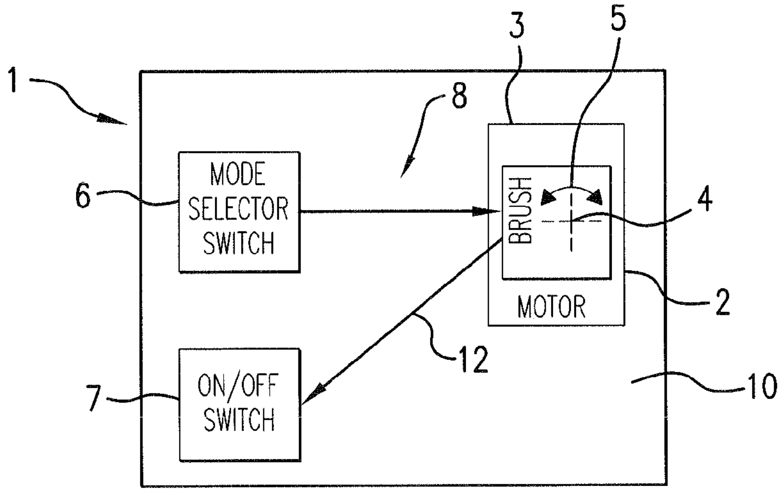

FIG. 1 is a schematic depiction of a machine tool with an adjusting device, according to a first exemplary embodiment, FIG. 2 is a schematic depiction of a machine tool with an adjusting device, according to a second exemplary embodiment, and FIG. 3 is a schematic depiction of a machine tool with an adjusting device, according to a third exemplary embodiment.

DESCRIPTION OF THE EXEMPLARY EMBODIMENTS

FIG. 1 shows the basic design of a machine tool 1. Only the essential drive and operating components of machine tool 1 are shown in the illustration. A not-shown tool in a not-shown tool fitting of machine tool 1 is driven by an electric motor 2 using further components of machine tool 1, which convert its rotational motion into a motion of the tool. Electric motor 2 includes an electrical, adjustable brush configuration 3, which can be rotated around a fixed point of rotation 4 (double arrow 5). The angular position of brush configuration 3 determines the commutation angle of electric motor 2 and, therefore, the electrical and drive-related parameters.

To operate machine tool 1, at least one mode selector switch 6 and one on/off switch 7 are provided. Mode selector switch 6 is used to select the operating mode of the not-shown tool. It can be designed, e.g., as a mechanical switch that acts on the components of machine tool 1 via a mechanical system. The components convert the rotary motion of the electric motor into the motion of the tool. The mechanical switch includes the individual, available operating modes as switch settings. As an alternative, the operating mode switch is an electrical switch, at the least, which acts on the components named above via an electrical switch/control. With an adjusting device 8, brush configuration 3 of electric motor 2 is automatically rotated as well, depending on the setting of mode selector switch 6 (double arrow 5). A branch 9 of adjusting device 8 acts on the on/off switch, which also acts on the drive of the tool via electric motor 2. On/off switch 7 is designed, e.g., as a push-button switch, which can be retained in the pressed-down "on" position by an arresting element controlled by adjusting device 8, and which can then be released. When on/off switch 7 is released, it returns to the "off" position or is held in the "on" position by the active arresting element.

The following advantages result from the operative connection between mode selector switch 6 and brush configuration 2 or on/off switch 7 using adjusting device 8: With an operating mode that requires a faster tool motion, adjusting device 8 rotates brush configuration 3 into a setting in which electric motor 2 rotates faster and, therefore, higher tool output is attained without the use of additional electronics. The rotation of brush configuration 3 brought about by adjusting device 8 can also be used to switch the motor from right-hand rotation to left-hand rotation. The decisive advantage of automatically adjusting brush configuration 3 depending on the setting of mode selector switch 6 is that the operator does not need to know which setting of brush configuration 3 is appropriate for which operating mode, thereby ensuring that a user can always operate the machine tool correctly even without technical knowledge. Via branch 9 of adjusting device 8, mode selector switch 6 also acts on on/off switch 7. Adjusting device 8 influences, e.g., the arresting element of on/off switch 7 such that it operates in the push-button switch mode or the click-stop switch mode, depending on the operating mode that was selected. In the push-button switch mode, the on/off switch returns to the "off" position when released, while, in the click-stop mode, the arresting element holds the switch in the "on" position until the arresting element is released. A link of this type between mode selector switch 6 and on/off switch 7 is practical for hand-held power tools 10 in particular that have operating modes with which the tool rotates or does not rotate, depending on the operating mode that was selected. With a rotary hammer, on/off switch 7 can be best handled with click-stop switch operation in the "hammer" mode (chiseling operation), while it can only be operated as a push-button switch (dead man's switch) in the "drill" mode, due to safety regulations.

FIG. 2 shows a further exemplary embodiment of the present invention, which basically corresponds to that of FIG. 1. Therefore, only the differences will be discussed. The differences are that mode selector switch 6 now no longer acts via a branch 9 of adjusting device 8 on on/off switch 7. Instead, a separate part 11 of adjusting device 8 establishes the operative connection between mode selector switch 6 and on/off switch 7. An adjusting device 8 with separate parts is always used when, e.g., with a mechanical adjusting device 8, the required displacement motion of on/off switch 7 deviates from the brush configuration so extremely that it is not practical to deduce the motion via a branch 9. If brush configuration 3 and on/off switch 7 are displaced in entirely different ways, e.g., electrical and mechanical, this is also carried out using separate parts of adjusting device 8, i.e., an electrical part and a mechanical part.

FIG. 3 shows a third exemplary embodiment of the present invention, with which adjusting device 3 continues to act between mode selector switch 6 and brush configuration 3, but the operative connection with on/off switch 7 is now established via a separate part 12 between brush configuration 3 and on/off switch 7. In this case, it is also ensured that the operating mode of the on/off switch (push-button operation or click-stop switch operation) depends on the operating mode selected with mode selector switch 6.

What is claimed is:

1. A machine tool with an electric motor (2) that serves to drive a tool and includes an adjustable electric brush configuration (3), and with a mode selector switch (6) with various switch positions, characterized by an adjusting device (8) that displaces the brush configuration (3) depending on a switch setting of the mode selector switch (6), and with an on/off switch (7) for the electric motor (2), wherein the on/off switch (7) is operatively connected with the adjusting device (8) and functions in one of a push-button switch mode and a click-stop switch mode, depending on the switch setting.

2. The machine tool as recited in claim 1, wherein the adjusting device (8) is a mechanical and/or an electrical adjusting device (8).

3. The machine tool as recited in claim 1, characterized by a branch (9) of the adjusting device (8) acting between the mode selector switch (6) and the brush configuration (3), which also allows the mode selector switch (6) to act on the on/off switch (7) or a separate part (11, 12) of the adjusting device (8), which establishes the operative connection between the mode selector switch (6) and the on/off switch (7) and/or between the brush configuration (3) and the on/off switch (7).

4. The machine tool as recited in claim 1, wherein the machine tool (1) is a hand-held power tool (10).

5. A method for operating a machine tool with an electric motor (2) that serves to drive a tool and that includes an adjustable electric brush configuration (3), and with a mode selector switch (6) with various switch positions, and with an on/off switch (7) for the electric motor (2), wherein the on/off switch (7) functions in one of a push-button switch mode and a click-stop switch mode, depending on a mode selected on the mode selector switch (6), wherein the brush configuration (3) is adjusted automatically depending on the selected mode.

6. The method as recited in claim 5, wherein the on/off switch functions in the push-button switch mode with a rotating tool.

7. The method as recited in claim 5, wherein the on/off switch functions in the click-stop switch mode with a striking tool.

8. The method as recited in claim 5, characterized by at least one setting of the brush configuration (3) that can be selected using the mode selector switch (6) and that increases a rotational speed of the electric motor (2).

* * * * *